United States Patent [19]

Evers

[11] 4,122,735
[45] Oct. 31, 1978

[54] ARRANGEMENT FOR ADVANCING ROD STOCK PIECES IN TURNING MACHINES

[75] Inventor: Alfred Evers, Neumünster, Fed. Rep. of Germany

[73] Assignee: Hagenuk Vormals Neufeldt & Kuhnke GmbH, Kiel, Fed. Rep. of Germany

[21] Appl. No.: 775,362

[22] Filed: Mar. 4, 1977

[30] Foreign Application Priority Data

Mar. 6, 1976 [DE] Fed. Rep. of Germany ....... 2609416

[51] Int. Cl.² .............................................. B23B 13/00
[52] U.S. Cl. ...................................................... 82/2.7
[58] Field of Search ..................... 82/2 R, 3, 2.5, 2.7; 214/1.1, 1.4

[56] References Cited

U.S. PATENT DOCUMENTS

| 1,539,440 | 5/1925 | Smith et al. | 82/3 |
| 2,742,656 | 4/1956 | Fischer | 82/2.7 |
| 3,372,449 | 3/1968 | Jamison | 82/3 |
| 3,917,143 | 11/1975 | Yourkievitz | 214/1.1 |
| 3,941,256 | 3/1976 | Doe et al. | 214/1.4 |
| 3,955,687 | 5/1976 | Flisch | 82/2.7 |

Primary Examiner—Harrison L. Hinson
Attorney, Agent, or Firm—Michael J. Striker

[57] ABSTRACT

Rod stock pieces are successively fed in a path to a work station of a multiple spindle automatic turning machine such as a lathe. A slide member supports a trailing rod stock piece and is mounted on the machine for movement towards and away from the work station. The slide member is coupled with a drive of the turning machine to thereby move the slide member together with the rod stock piece supported therewith through a stroke of predetermined length. The length of the stroke of the slide member is adjusted in dependence upon the length of the leading rod stock piece located at the work station.

9 Claims, 2 Drawing Figures

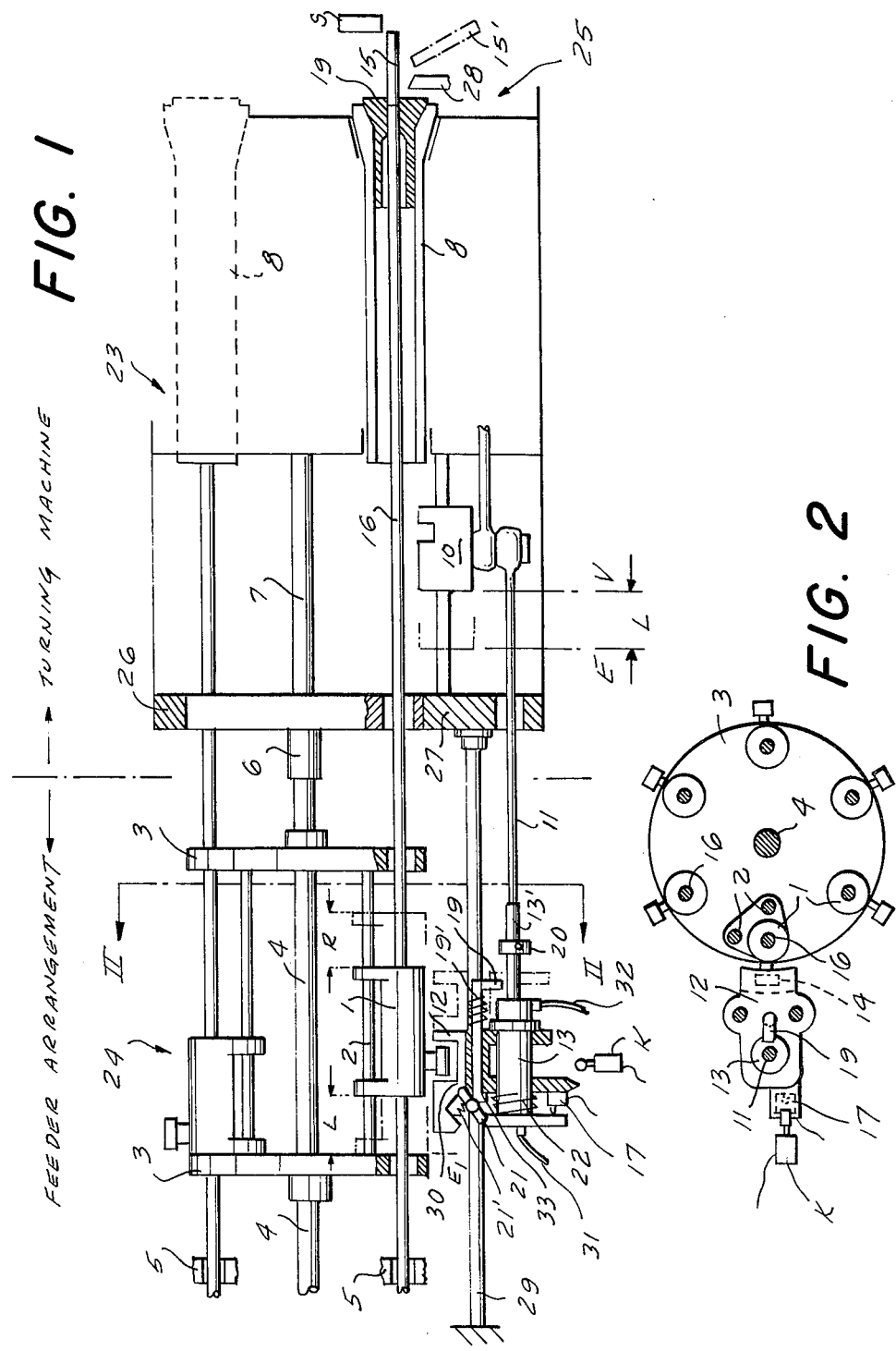

ARRANGEMENT FOR ADVANCING ROD STOCK PIECES IN TURNING MACHINES

BACKGROUND OF THE INVENTION

The present invention relates generally to automatic turning machines and, more particularly, to multiple spindle automatic lathes. Still more particularly, the present invention relates to an arrangement for advancing rod stock pieces in such turning machines.

It has been proposed to feed a plurality of rod stock pieces to a work station of an automatic turning machine by advancing a movable slide member. The slide member has a hollow spindle which surrounds a respective rod stock piece, and a slip clutch mechanism which advances the surrounded rod stock piece only when the slide member is moved in direction towards the work station. The slide member is reciprocally moved by pressurizable air cylinders.

However, such prior-art constructions have the disadvantage that the feeding time is dependent upon many variables. For example, the time required to advance successive workpiece portions of the rod stock pieces depends upon the operating air pressure of the air cylinder units, the mass of the rod stock pieces themselves, and the frictional relationships between the moving parts. As additional workpiece portions of a single rod stock piece are cut away, the residual length of the respective rod stock piece becomes correspondingly reduced. This means that the mass and frictional characteristics of the residual rod stock piece are constantly decreasing, a fact which must be considered particularly during acceleration of the rod stock piece towards a work station.

For quick-working automatic turning machines, the clampable jaws which hold a respective rod stock piece must open and close within very short time intervals. The pressurized air cylinders of the prior art have proven to be highly unsatisfactory in advancing the rod stock pieces through such jaws in the required time intervals. In order to accommodate such quick-working machines, the air cylinders must be operative to accelerate the respective rod stock piece to extremely high values. This is further disadvantageous in that very high air pressure magnitudes are required which, in turn, causes the leading end of the respective rod stock piece to impact against an automatic stop of the turning machine with a relatively high impact force. In extreme cases, the leading end of the respective rod stock piece strikes the stop at such high energy that deformation of the leading end occurs.

SUMMARY OF THE INVENTION

Accordingly, it is a general object of the present invention to overcome the disadvantages of the prior art.

It is another object of the present invention to provide a highly reliable and fast-acting arrangement for advancing rod stock pieces towards a work station of an automatic turning machine.

It is still a further object of the present invention to provide an arrangement for advancing rod stock pieces which is compatible with existing automatic turning machines.

In keeping with these objects and others which will become apparent hereinafter, one feature of the invention resides, briefly stated, in an arrangement for advancing rod stock pieces in a turning machine of the type having a drive and a work station at which successive workpiece portions of the rod stock pieces are to be treated. The arrangement includes means for successively feeding the rod stock pieces to the work station. The feeding means is comprised of a slide member which is mounted on the machine for movement towards and away from the work station and which is operative for supporting a rod stock piece. The arrangement further includes means for coupling the slide member with the drive to thereby move the slide member together with the rod stock piece supported therewith through a stroke of predetermined length. Still furthermore, the arrangement includes means for adjusting the length of the stroke of the slide member in dependence upon the length of the rod stock piece located at the work station.

In accordance with the invention, the drive of the automatic turning machine is directly and preferably mechanically linked to the slide member. This feature assures that the synchronous movement of the drive is automatically and correspondingly transmitted to the rod stock piece supported by the slide member without being subject to the prior-art drawbacks noted above.

Moreover, the feature of adjusting the length of the stroke is highly advantageous. Each rod stock piece is advanced by a predetermined stroke length by the coupling means. If one wishes to expel the residual length of a respective rod stock piece for any reason, for example the residual length of the respective rod stock piece is too short to be properly clamped and treated at the work station, then the adjusting means is operative for expelling this residual length by increasing the stroke length to a value greater than said predetermined stroke length.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a longitudinal view in partial vertical section of a turning machine having a work station at which successive rod stock pieces are advanced in accordance with the arrangement of the present invention; and FIG. 2 is a cross-section of the arrangement taken along line II—II of FIG. 1.

DESCRIPTION OF THE PREFERRED EMBODIMENTS

The left side of FIG. 1 shows a preferred embodiment of a feeding arrangement 24 for advancing a plurality of rod stock pieces in a turning machine, such as an automatic turning machine, preferably a multi-spindle lathe. The right side of FIG. 1 depicts only those parts of a turning machine 23 which are necessary for an understanding of the feeding arrangement 24, as will be shown herein.

The turning machine 23 has a plurality of successively arranged work stations. One of these work stations is a feeder station, identified by reference numeral 25, and a plurality of rod stock pieces 16 are respectively advanced towards this feeder station 25. Each rod stock piece 16 is of predetermined length such that a plurality of workpiece portions of identical or different lengths can be obtained from a single rod stock piece 16. The feeding arrangement 24 is normally operative for stepwise advancing a respective rod stock piece 16 by an amount corresponding to the length of a particular workpiece portion. Subsequently, a drive of the turning machine 23 is operative for rotating drive shaft 7 and thereby moving the respective workpiece portion through the remaining work stations of the turning machine wherein successive machining operations occur.

The feeding arrangement 24 comprises a plurality of slide members 1. Each slide member 1 is mounted on a guide rail 2 for reciprocating sliding movement in a path towards and away from the work station 25. Each slide member 1 has a hollow spindle which surrounds a respective rod stock piece 16, and a non-illustrated slip clutch inside the spindle which is operative for positively engaging and thereby moving rod 16 when the slide member 1 is moved towards the work station 25, and for slipping relative to rod 16 when the slide member 1 is moved away from the work station 25.

Each guide rail 2 is mounted intermediate annular end plates 3 and about the other marginal portions of the latter. This drum-shaped assembly, as more clearly shown in FIG. 2, is rotatable about central shaft 4. The number of guide rails 2 and associated slide members 1 corresponds to the number of work stations or spindles of the multi-spindle automatic turning machine.

Each rod stock piece 16 is guided towards a respective slide member 1 by guides 5, and the entire assembly of guides 5, slide members 1, guide rails 2, and end plates 3 is rotatable in fixed position relative to each other as a unit by drive shaft 7 which drives central shaft 4 by means of coupler 6. Put another way: machine section 26 is movable relative to machine section 27.

Feeder station 25 has a spindle 8 and jaws 9 which are alternately movable towards each other to clamp rod 16 therebetween, or movable away from each other to release rod 16 and permit the latter to be advanced through a predetermined distance through the spindle 8. The time required for opening and closing the jaws 9 is conventionally controlled by cam, spring or hydraulic drives. This predetermined distance through which the rod 16 is advanced is determined by the length of the stroke of the coupling means 11–13.

The coupling means 11–13 is operative for interconnecting the drive of the turning machine 23 with the slide member 1. The drive is connected with the reciprocating block 10 which is movable between end positions E and V, i.e., through a predetermined stroke length L. This length L corresponds to the actual length of a workpiece to be treated plus the width of a tool bit 28 located at the work station 25.

The block 10 is connected to one end of a coupling rod 11 whose other end is connected to a piston component 13' of a piston and cylinder control unit having a cylinder component 13. The cylinder component 13 is normally fixedly mounted to a slide carriage 12 which, in turn, is mounted for sliding movement along support rail 29. The slide carriage 12 is formed with a recess 30 operative for receiving annular bearing or projection 14 when the rotatable assembly is rotated.

The operation of coupling means 11–13 proceeds as follows:

The block 10 is moved by the drive of the turning machine from end position E to end position V. This movement is directly and mechanically transmitted to rod member 16 by coupling rod 11, piston component 13', cylinder component 13, slide carriage 12, projection 14 and slide member 1. Pressurized fluid flows through conduits 31 and 32 such that the piston component 13' is constantly outwardly urged towards its illustrated position extending out of cylinder component 13. In this mode of operation, no relative movement occurs between piston component 13' and cylinder component 13 because of the control pressures existing in the control unit.

Slide member 1 is thus moved from its end position $E_1$ through a stroke of length L, as illustrated in FIG. 1. Prior to such movement, the clamping jaws 9 are moved apart of each other. The leading end of a respective rod is thus moved until it abuts against a stop S. This stop S is mounted on the machine for pivoting movement between an illustrated unblocking position, and a blocking position in which the leading end of a respective rod 16 contacts the stop S. After the leading end of rod 16 contacts the stop S, the clamping jaws 9 move towards each other and clamp the rod in this position. The block 10 thereupon returns to its end position E, and slide member 1 simultaneously returns to its end position $E_1$.

At this point, the drive shaft 7 rotates the rotatable assembly so that the clamped, projecting portion of a rod can be further machined at successive work stations. This cycle is repeated at the feeder station 25 until the residual or remainder portion 15 of a respective rod, i.e., the trailing portion of a respective rod which remains after leading workpiece portions of the respective rod have been removed, is to be expelled from the feeder station 25.

As before, the clamping jaws 9 have already been opened, the block 10 has been moved to end position V, the pivotable stop S has been moved away from the leading end of the rod (i.e., stop S is in the illustrated position), and the slide member 1 has been moved through a stroke of length L. If the residual portion 15 has a length shorter than the workpiece length or stroke L, then moving the next successive rod 16 through a stroke of length L will automatically cause the residual portion 15 to fall out of the feeder station 25, as diagrammatically shown by dashed residual portion 15'.

However, if the residual portion 15 has a length longer than the workpiece length or stroke L, and if it is still desired to expel the residual portion 15, then the cylinder and piston control unit is operative to increase the length of the stroke of the feeder arrangement. For example, this situation occurs when the next workpiece length is very short and the clamping jaws do not have sufficient rod length to properly hold the workpiece portion.

In order to thereby adjust the length of the stroke of the slide member 1 in dependence upon the length of the rod stock piece located at the feeder station 25, the flow of pressurized fluid flowing through conduits 31 and 32 is controlled such that the cylinder component 13 is permitted to move relative to the piston component 13'. The block 10 remains stationary in its end position V for a time sufficient to allow cylinder component 13 to be displaced relative to the stationary piston component 13' in direction towards the right in FIG. 1. The movement of cylinder component 13 will thus cause the slide member 1 to move through an additional distance or adjusted stroke length R. This additional distance is selected to be sufficient to expel the residual portion 15.

A control switch K has an actuating portion located in the path of displacement of the control unit and is operative for actuating pivoting of the stop S from the illustrated unblocking position to its blocking position in the feeder station 25.

As previously noted, the cylinder component 13 of the control unit is normally blocked so that it is normally prevented from moving relative to the slide carriage 12 by a blocking pawl 21 and blocking spring 21'. The pawl 21 is released from its blocking position by cooperation between an actuating rod and an ajustably mounted abutment member 20 in the following manner: The abutment member 20 is adjustably mounted at any desired position along the length of piston component 13'. The actuating rod is mounted on the slide carriage 12 and has a leading end 19 which is juxtaposed with the abutment 20, and a trailing end 33 which is juxtaposed with the pawl 21.

After the control unit together with the slide carriage 12 move through a predetermined distance, the leading end 19 abuts against abutment member 20 and thereby causes the trailing end 33 to move into engagement with the pawl 21 and trip the latter. Now, the cylinder component 13 can move relative to the slide carriage 12 in direction towards feeder station 25. It will be noted that the slide carriage 12 is stationary at this time because the control switch K has pivoted the stop S to the blocking position, thus blocking further advancement of the rod 16, the slide member 1 and the carriage 12.

As the cylinder 13 moves relative to carriage 12, the spring 22 is compressed to an increasing extent until an actuating portion of control switch 17 is depressed for reactivating the drive of the turning machine. This causes the clamping jaws 9 to move towards each other again, and the block 10 to return to its end position E. In accordance with the invention, even high acceleration forces generated during the stepwise advancement of a respective rod can be effectively transmitted from the drive to the respective rod without inadvertently actuating the control switch 17. The direction of movement of cylinder 13 is simultaneously reversed until spring 21' is operative to restore pawl 21 back to its blocking position and until spring 19' is operative to restore actuating rod 19, 33 back to its original position. Thereupon the cylinder 13, carriage 12 and slide member 1 are moved back until the slide member 1 is returned to its end position E₁. This completes the operation of the adjusting means. The drive will then operate to rotate the rotatable assembly for another cycle.

The invention can also be used with single spindle turning machines, or any other machine having a work station towards which workpieces are to be advanced by a feeder arrangement. The invention thus integrates into a machine an inexpensive and reliable feeder arrangement which has the capability to expel a residual portion of a respective rod stock piece.

It will be understood that each of the elements described above, or two or more together, may also find a useful application in other types of constructions differing from the types described above.

While the invention has been illustrated and described as embodied in an arrangement for advancing rod stock pieces in turning machines, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for advancing rod stock pieces in a turning machine of the type having a drive and a work station at which successive workpiece portions of the rod stock pieces are to be treated, comprising means for successively feeding a rod stock piece to the work station, including a slide member for supporting a rod stock piece and being mounted on the machine for movement towards and away from the work station; means for coupling said slide member with the drive to thereby move said slide member together with the rod stock piece supported therewith through a stroke of predetermined length, including a slide carriage mounted on the machine for movement towards and away from the work station, means on said slide carriage and on said slide member for interconnecting said slide carriage and said slide member to thereby permit concomitant movement on said slide carriage and said slide member, and a control unit having a piston component and a cylinder component, one of said components being connected with said slide carriage and the other of said components being connected with the drive; and means for adjusting the length of the stroke of said slide member in dependence upon the length of the rod stock piece at the work station, including means for displacing one of said components relative to the other of said components to thereby move said slide carriage together with said slide member through a stroke of length greater than said predetermined stroke length.

2. An arrangement as defined in claim 1, wherein said interconnecting means includes a projection on said slide member, and a recess on said slide carriage and operative for receiving said projection.

3. An arrangement as defined in claim 1, wherein said coupling means still further includes a coupling rod having one end connected with said control unit and another end connected with the drive, said coupling rod being mounted on the machine for reciprocating movement relative to the work station.

4. An arrangement as defined in claim 1; and further comprising means for normally blocking relative movement between said control unit and said slide carriage; and also comprising means for releasing said control unit from said slide carriage during operation of said displacing means to thereby permit relative movement in a path between said control unit and said slide carriage in a predetermined direction.

5. An arrangement as defined in claim 4, wherein said blocking means includes a blocking pawl located intermediate said slide carriage and said control unit; and wherein said releasing means includes an abutment member on one of said components, and an actuating rod movable with the other of said components, said actuating rod having a trailing end juxtaposed with said blocking pawl, and a leading end juxtaposed with said abutment member and operative during operation of said displacing means for abutting against said abutment member and for moving said trailing end into engagement with said blocking pawl and thereby tripping the latter.

6. An arrangement as defined in claim 4; and further comprising reversing means in the path of relative movement between said control unit and said slide carriage for actuating the drive to thereby move said other component in direction opposite to said predetermined direction.

7. An arrangement as defined in claim 1; and further comprising a stop mounted at the work station for pivoting movement between an unblocking position, and a blocking position in which said stop is juxtaposed with a leading end of the rod stock piece at the work station; and also comprising means in the path of displacement of said one component for actuating pivoting of said stop from said unblocking position towards said blocking position.

8. An arrangement as defined in claim 1, wherein said feeding means includes a rotatable magazine assembly having additional slide members similar to said first-mentioned slide member, and a plurality of guide rails on which all of said slide members are mounted.

9. An arrangement for advancing rod stock pieces in a turning machine of the type having a drive and a work station at which successive workpiece portions of the rod stock pieces are to be treated, comprising means for successively feeding a rod stock piece to the work station, including a slide member for supporting a rod stock piece and being mounted on the machine for movement towards and away from the work station so as to move successive workpiece portions of the rod stock piece to the work station; means for coupling with the drive to thereby move said slide member together with the rod stock piece supported therewith through a stroke of a predetermined length; and means for displacing said slide member together with said rod stock piece through an additional stroke sufficient to expel the remaining rod stock piece when the length of said rod stock piece decreases to a predetermined minimum length.

* * * * *